(12) United States Patent
Blackburn et al.

(10) Patent No.: US 7,010,111 B1
(45) Date of Patent: Mar. 7, 2006

(54) AUDIBLE CONFIRMATION USING TEXT TO SPEECH CONVERSION

(75) Inventors: Connie Blackburn, Milpitas, CA (US); Joel Brand, Milpitas, CA (US); Douglas William Varney, Naperville, IL (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/513,029

(22) Filed: Feb. 25, 2000

Related U.S. Application Data

(60) Provisional application No. 60/121,721, filed on Feb. 26, 1999.

(51) Int. Cl.
*H04M 3/42* (2006.01)
(52) U.S. Cl. ............................. 379/207.14; 379/88.16
(58) Field of Classification Search ............. 379/201.5, 379/207.14, 88.03, 201.07, 207.16, 67, 201, 379/213, 88.16, 93.12, 88, 89, 67.1
See application file for complete search history.

(56) References Cited

U.S. PATENT DOCUMENTS

| | | | | |
|---|---|---|---|---|
| 4,625,081 A | * | 11/1986 | Lotito et al. ................. | 379/196 |
| 5,058,152 A | | 10/1991 | Solomon et al. .............. | 379/67 |
| 5,339,352 A | | 8/1994 | Armstrong et al. ........... | 379/58 |
| 5,406,616 A | | 4/1995 | Bjorndahl ..................... | 379/59 |
| 5,471,521 A | | 11/1995 | Minakami et al. ............ | 379/88 |
| 5,487,111 A | | 1/1996 | Slusky ........................ | 379/211 |
| 5,524,147 A | | 6/1996 | Bean ............................ | 379/265 |
| 5,537,464 A | | 7/1996 | Lewis et al. ................. | 379/114 |
| 5,539,807 A | | 7/1996 | Ghisler et al. ................ | 379/58 |
| 5,572,579 A | | 11/1996 | Orriss et al. ................. | 379/142 |
| 5,577,110 A | | 11/1996 | Aquino ....................... | 379/201 |
| 5,583,920 A | | 12/1996 | Wheeler, Jr. ................. | 379/88 |
| 5,596,573 A | | 1/1997 | Bertland ..................... | 370/474 |

(Continued)

FOREIGN PATENT DOCUMENTS

EP     0 481 683 A2    4/1992

(Continued)

OTHER PUBLICATIONS

T. Yoshida, N. Terashima, "A Conceptual Study of a Voice Conversation Facility in Intelligent NW Voice Mail" May 27-Jun. 1, p. 129-136, Stockholm, Sweden.

(Continued)

*Primary Examiner*—Fan Tsang
*Assistant Examiner*—Olisa Anwah
(74) *Attorney, Agent, or Firm*—Haverstock & Owens LLP

(57) ABSTRACT

An audible confirmation system automatically and seamlessly outputs an audible name of a call recipient to a calling party. This audible confirmation system is preferably configured to audibly identify the call recipient to the calling party prior to the call recipient and the calling party communicating with each other. The audible confirmation system preferably includes a text to speech converter coupled to an intelligent network architecture having at least one calling name database. The audible confirmation system allows the calling party to audibly identify the call recipient to the calling party without any input from the call recipient and without using any special equipment such as a display screen by the calling party. The audible confirmation system is especially useful when the call recipient does not have voice mail service and is not available to receive a call. For example, by utilizing the audible confirmation system, the calling party is able to confirm the identity of the call recipient prior to leaving a confidential message for the call recipient by utilizing the calling party's voice mail delivery system for automatically delivering the confidential message to the call recipient.

14 Claims, 3 Drawing Sheets

U.S. PATENT DOCUMENTS

| | | | |
|---|---|---|---|
| 5,625,682 A | 4/1997 | Gray et al. | 379/266 |
| 5,668,863 A | 9/1997 | Bieselin et al. | 379/202 |
| 5,712,903 A | 1/1998 | Bartholomew et al. | 379/89 |
| 5,732,216 A | 3/1998 | Logan et al. | 395/200.33 |
| 5,737,725 A | 4/1998 | Case | 704/260 |
| 5,742,905 A | 4/1998 | Pepe et al. | 455/461 |
| 5,764,746 A | 6/1998 | Reichelt | 379/207 |
| 5,850,629 A | 12/1998 | Holm et al. | 704/260 |
| 5,896,441 A | 4/1999 | Akazawa et al. | 379/9 |
| 5,922,045 A | 7/1999 | Hanson | 709/206 |
| 5,970,133 A * | 10/1999 | Salimando | 379/213.01 |
| 5,995,613 A | 11/1999 | Goel et al. | 379/221 |
| 6,016,336 A | 1/2000 | Hanson | 379/88.23 |
| 6,061,432 A | 5/2000 | Wallace et al. | 379/88.18 |
| 6,078,655 A * | 6/2000 | Fahrer et al. | 379/220.01 |
| 6,084,892 A | 7/2000 | Benash et al. | 370/701 |
| 6,161,087 A | 12/2000 | Wightman et al. | 704/215 |
| 6,163,855 A | 12/2000 | Shrivastava et al. | 714/4 |
| 6,167,119 A | 12/2000 | Bartholomew et al. | 379/88.04 |
| 6,185,288 B1 | 2/2001 | Wong | 379/219 |
| 6,199,076 B1 | 3/2001 | Logan et al. | 707/501 |
| 6,226,289 B1 | 5/2001 | Williams | 370/385 |
| 6,229,880 B1 | 5/2001 | Reformato et al. | 379/88.01 |
| 6,233,234 B1 | 5/2001 | Curry et al. | 370/356 |
| 6,233,315 B1 | 5/2001 | Reformato et al. | 379/88.01 |
| 6,282,270 B1 | 8/2001 | Porter | 379/88.17 |
| 6,289,090 B1 * | 9/2001 | Tessler et al. | 379/207.02 |
| 6,317,484 B1 | 11/2001 | McAllister | 379/88.02 |
| 6,330,308 B1 | 12/2001 | Cheston, III et al. | 379/88.04 |
| 6,381,325 B1 | 4/2002 | Hanson | 379/218.01 |
| 6,389,126 B1 | 5/2002 | Bjornberg et al. | 379/201.03 |
| 6,400,804 B1 | 6/2002 | Bilder | 379/76 |
| 6,424,647 B1 | 7/2002 | Ng et al. | 370/352 |
| 6,427,002 B1 | 7/2002 | Campbell et al. | 379/88.01 |
| 6,442,169 B1 | 8/2002 | Lewis | 370/401 |
| 6,493,438 B1 | 12/2002 | Gross et al. | 379/114.22 |
| 6,650,737 B1 * | 11/2003 | Finnigan | 379/88.02 |

FOREIGN PATENT DOCUMENTS

| | | |
|---|---|---|
| EP | 0543235 A2 | 5/1993 |
| EP | 0 679 005 A1 | 10/1995 |
| EP | 0 856 979 A2 | 8/1998 |
| EP | 0905959 A2 | 3/1999 |
| GB | 2 252 014 A | 7/1992 |
| JP | 10079785 | 3/1998 |
| WO | WO 98/09421 | 3/1998 |
| WO | WO 98/09422 | 3/1998 |
| WO | WO 98/11704 | 3/1998 |
| WO | WO 99/29083 | 6/1999 |

OTHER PUBLICATIONS

Deixler, Lyle, "Iwatsu's New ADIX-S, This starter phone system can grow with your company", Mar. 1997, p. 44-45, Teleconnect, vol. 15, Issue 3.

Chung-Hsien Wu, et al., "Speech Activated Telephony Email Reader (SATER) Based on Speaker Verification and Text-To-Speech Conversion", Institute of Information Engineering, IEEE Transactions on Consumer Electronics, vol. 43, No. 3, Aug. 1997, pp. 707-716.

Cristina Delogu, et al., "Spectral Analysis of Synthetic Speech and Natural Speech with Noise Over the Telephone Line", Istituto Superiore Poste e Telecommunicazioni, v.le Europa 190,00144 Roma, p. 1409-1412.

Masanobu Abe, et al. "A New Framework to Produce Multimedia Content by Combining Synthesized Speech and Moving Pictures in the WWW Environment", NTT Cyber Space Labs, Japan, 1999, pp. 611-616.

* cited by examiner

AUDIBLE CONFIRMATION USING TEXT TO SPEECH CONVERSION

RELATED APPLICATIONS

This application claims priority under 35 U.S.C. § 119(e) of the U.S. provisional application Ser. No. 60/121,721 filed on Feb. 26, 1999 and entitled "Audible Confirmation Using Text to Speech Conversion." The provisional application Ser. No. 60/121,721 filed on Feb. 26, 1999 and entitled "Audible Confirmation Using Text to Speech Conversion" is also hereby incorporated by reference.

FIELD OF THE INVENTION

This invention relates to the field of telecommunications communications systems. More particularly, this invention relates to the field of voice telecommunications systems employing text to speech converters.

BACKGROUND OF THE INVENTION

Currently, selected local telephone service providers offer a caller identification service that identifies a telephone number of a calling party to a recipient party of the call. For the recipient party to receive the telephone number of the calling party, the recipient party typically needs to utilize a special display device to visually read the telephone number offered by the caller identification service.

Presently, there are also display telephones that have a screen which displays a telephone number being dialed by the calling party. In theory, the calling party is able to visually confirm the telephone number that was dialed by the calling party and to then match up the displayed telephone number which was dialed by the calling party with the telephone number of the recipient party.

However, looking at a display screen is often inconvenient and sometimes not possible due to screen limitations, lighting environment of the screen, and/or user eyesight limitations which may ultimately render the screen unreadable to the user. Further, merely displaying a telephone number of the call recipient does not often provide enough information. For example, a telephone number by itself does not necessarily reveal the identity of the called party. Furthermore, the information shown on the display screen is actually stored within a corresponding telephone which may not allow the call recipient to accurately identify the calling party.

What is needed is an audible confirmation system that provides a user with an audible confirmation identifying a call recipient. What is also needed is an audible confirmation system that provides a user with an audible name identifying a call recipient. What is further needed is an audible confirmation system that operates within an existing Intelligent Network architecture and is available to a user utilizing only a conventional telephone.

SUMMARY OF THE INVENTION

The present invention is an audible confirmation system that automatically and seamlessly outputs an audible name of a call recipient to a calling party. This audible confirmation system is preferably configured to audibly identify the call recipient to the calling party prior to the call recipient and the calling party communicating with each other. The audible confirmation system preferably includes a text to speech converter for interfacing to a calling name database. The calling name database is made to be part of the intelligent network architecture.

In use, the audible confirmation system preferably locates an appropriate portion of the calling name database and retrieves a text name of the call recipient from the calling name database. The location of the appropriate portion of the calling name database is preferably based upon a unique identifier of the call recipient such as a telephone number. Next, the audible confirmation system preferably directs a text to speech converter to transform the text name of the call recipient into a corresponding audible identifier, eg., their spoken name. After the text to speech converter forms the corresponding audible identifier, the audible identifier is then transmitted to the calling party.

The audible confirmation system allows the calling party to audibly identify the call recipient to the calling party without any input from the call recipient and without using any special equipment such as a display screen by the calling party. The audible confirmation system is especially useful when the call recipient does not have a voice mail service and is not available to receive a call. For example, by utilizing the audible confirmation system, the calling party is able to confirm the identity of the call recipient prior to leaving a confidential message for the call recipient by utilizing the calling party's voice mail delivery system for automatically delivering the confidential message to the call recipient.

The present invention provides an audible confirmation system and method which operates within an existing Intelligent Network architecture and utilizes existing databases. Additionally, the present invention provides an audible confirmation system and method which automatically and seamlessly provides a calling party with an audible identification of a call recipient prior to communication between the calling party and the call recipient. Finally, the present invention provides an audible confirmation system and method that does not require the calling party to have special equipment.

DETAILED DESCRIPTION OF THE PREFERRED EMBODIMENT OF THE PRESENT INVENTION

Figure 1:
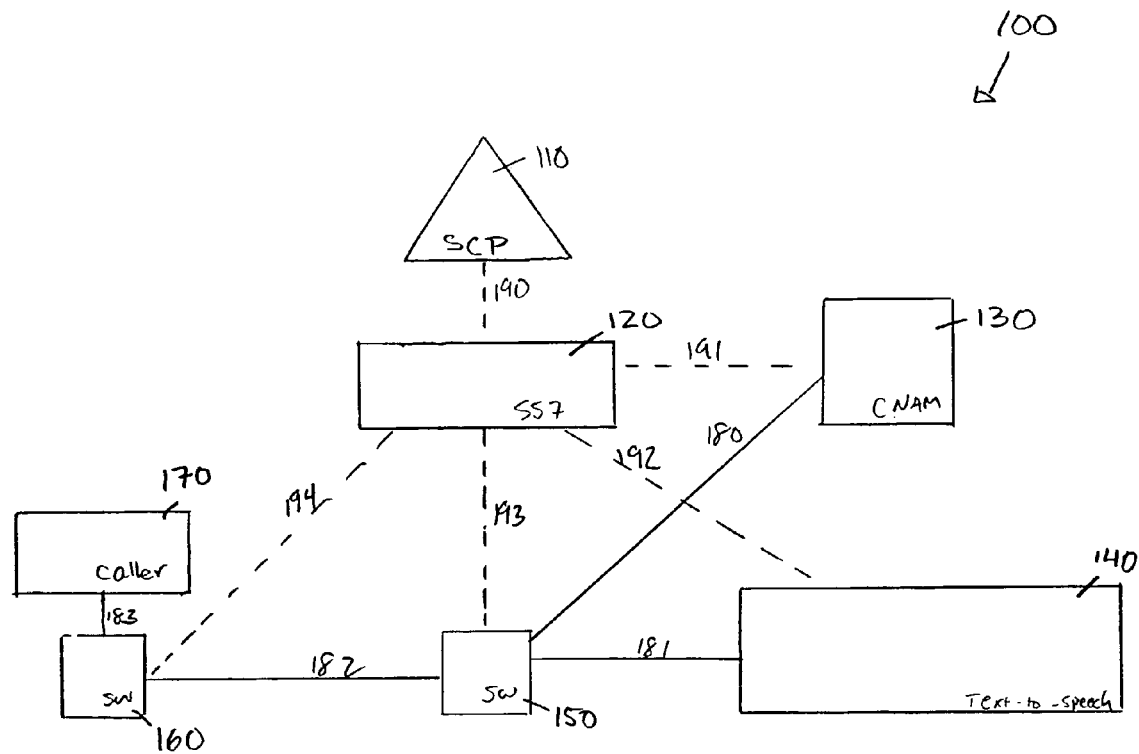
FIG. 1 illustrates a block diagram showing an audible confirmation system configured for implementing a preferred embodiment of the present invention.

The present invention is a text to speech conversion system and method which allows a calling party to hear an audible name of a call recipient prior to connecting the calling party to the recipient. This way, the calling party is able to audible identify the call recipient prior to speaking to the call recipient or leaving a voice mail message for the call recipient. FIG. 1 illustrates a block diagram showing an Intelligent Network architecture 100 configured for implementing a preferred embodiment of the present invention. The Intelligent Network architecture 100 is shown for exemplary purposes only. It will be apparent to those skilled in the art to modify, substitute, add or delete elements to the Intelligent Network architecture 100 without departing from the scope of the present invention.

The Intelligent Network architecture 100 of FIG. 1 includes a signal control point (SCP) 110, a signalling system No. 7 (SS7) network 120, a calling name database (CNAM) 130, a text to speech converter 140, switches 150 and 160, and a caller 170. Further, the architecture 100 also includes data links 180, 181, 182, and 183, and control links 190, 191, 192, 193, and 194.

The SCP 140 preferably provides control signals to and from the CNAM 130, the switches 150 and 160, and the text to speech converter 140, via the SS7 network 120. The SCP 110 is coupled to the SS7 network 120 via the control link 190. The CNAM 130 is coupled to the SS7 network 120 and the switch 150 via the control link 191 and the data link 180, respectively. The text to speech converter 140 is coupled to the SS7 network 120 and the switch 150 via the control link 192 and the data link 181, respectively. The switch 160 is coupled to the SS7 network 120 and the switch 150 via the control link 194 and the data link 182, respectively. The switch 150 is coupled to the SS7 network 120 via the control link 193. The caller 170 is coupled to the switch 160 via the data link 183. It would be apparent to those skilled in the art to utilize additional or fewer control links.

The CNAM 130 preferably stores a database of written telephone numbers and text names corresponding with each of the written telephone numbers. The text to speech converter 140 is configured to translate text messages into corresponding audible messages. In the present invention, the text to speech converter 140 is preferably configured to translate a text name within the CNAM 130 into a corresponding audible name.

The Intelligent Network 100 is shown for exemplary purposes only. It will be apparent to those skilled in the art to add or delete CNAMs, text to speech converters, switches, and signal control points.

Figure 2:
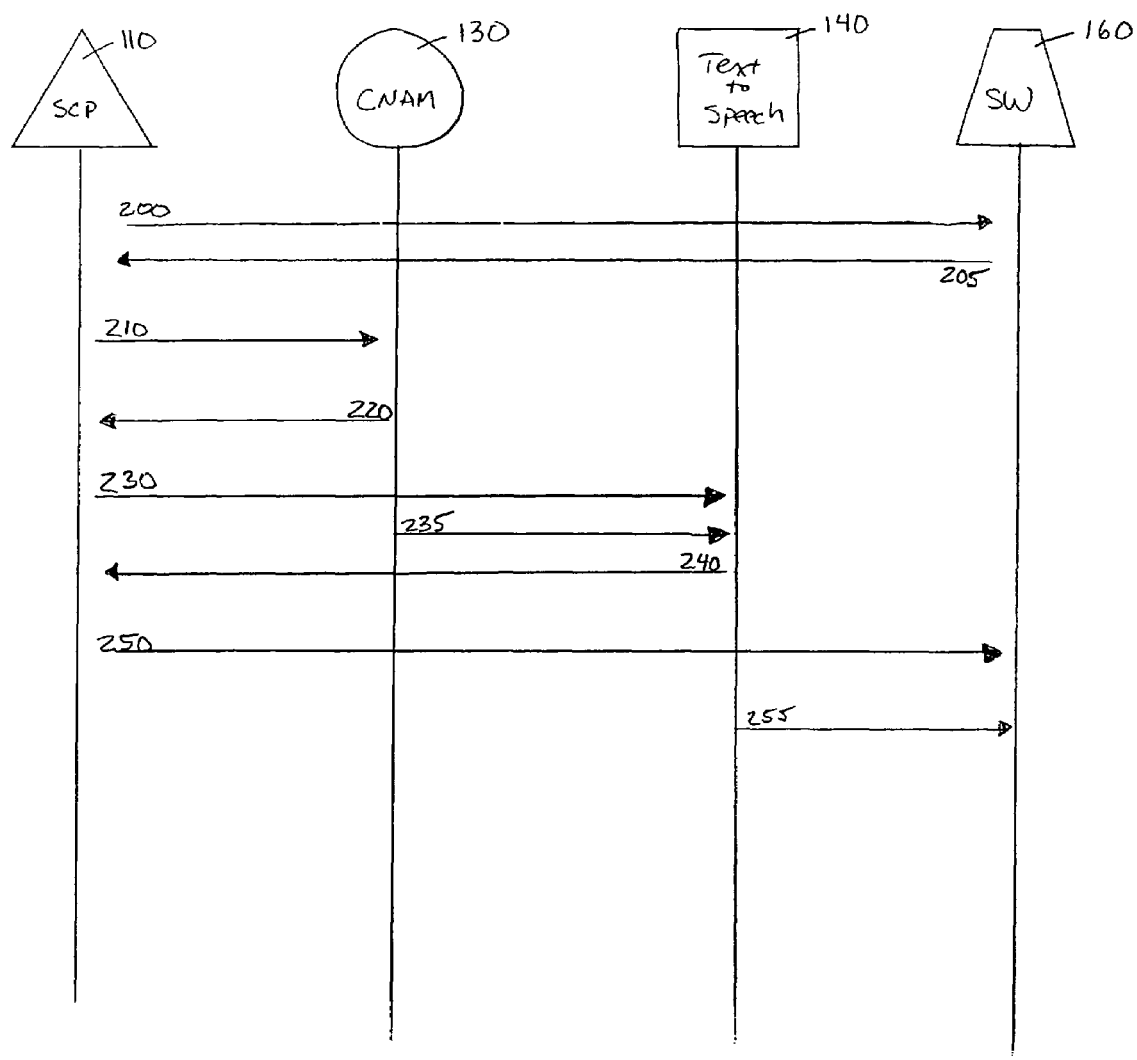
FIG. 2 illustrates a state diagram showing a sample operation of the present invention.

FIG. 2 illustrates a timing diagram for describing the operation of the preferred embodiment of the present invention. For the sake of simplicity and clarity, common elements shown in both FIGS. 1 and 2 also share common reference numerals. For example, the SCP 110, the CNAM 130, the text to speech converter 140, and the switch 160 are common in both FIGS. 1 and 2. To prevent obscuring the preferred embodiment of the present invention, selected details are omitted in FIG. 2 such as control links and data links between the SCP 110, the CNAM 130, the text to speech converter 140, and the switch 160 which are specifically shown in FIG. 1 and described above.

In this timing diagram, the CNAM 130 and the text to speech converter 140 in conjunction with the SCP 110 and the switch 160 are described in context with the overall functionality of the Intelligent Network 100. As shown in FIG. 2, this timing diagram illustrates interaction between the SCP 110, the CNAM 130, the text to speech converter 140, and the switch 160. According to the preferred embodiment the switch 160 supplies a data link to the calling party 170 (FIG. 1) for voice transmission, and the switch 150 (FIG. 1) provides data links between the CNAM 130, the switch 160, and the text to speech converter 140. However, it will be apparent to those skilled in the art that a variety of switches may be utilized to provide data links between the calling party 170 (FIG. 1), the CNAM 130, and the text to speech converter 140.

First, this timing diagram begins with an initiation sequence at step 200 wherein the SCP 110 preferably queries the switch 160 for commands which indicate that the calling party 170 (FIG. 1) is attempting an outgoing call. At step 205, the switch 160 preferably monitors the calling party 170 (FIG. 1) for attempts to initiate an outgoing call. Upon the calling party 170 (FIG. 1) initiating an outgoing call, the switch 160 preferably notifies the SCP 110 and transmits to the SCP 110 a unique identifier corresponding to the destination of the outgoing call. This unique identifier is preferably a telephone number.

Next, the SCP 110 preferably locates an appropriate CNAM which stores this particular unique identifier via the SS7 network 120 (FIG. 1). In this particular example, the CNAM 130 is the appropriate CNAM. As shown in the step 210, the SCP 110 queries the CNAM 130 for a text name associated with the particular unique identifier. In response to finding this text name, the CNAM 130 notifies the SCP 110 in the step 220.

Once the SCP 110 receives notification from the CNAM 130 that the corresponding text name is found, in the step 230, the SCP 110 preferably instructs the text to speech converter 140 to notify the SCP 110 when the corresponding text name is complete. Next, the CNAM 140 sends this corresponding text name to the text to speech converter 140 in the step 235. Preferably, the text to speech converter 140 transforms the text name into a corresponding audible name. After the corresponding audible name is formed, the text to speech converter 140 preferably informs the SCP 110 in the step 240. Next in the step 250, the SCP 110 preferably instructs the switch 160 to deliver the corresponding audible name to the calling party 170 (FIG. 1). Finally, the text to speech converter 140 transmits the corresponding audible name to the switch 160 in the step 255.

In use, the preferred embodiment of the present invention as described above and illustrated in FIGS. 1 and 2 has many practical applications. One such application is to ensure that a calling party correctly delivers a voice message to an intended call recipient when the call recipient does not have a voice mail service, and a voice mail delivery system is provided by a calling party. This application is described below for exemplary purposes only and is not intended to limit the scope of the preferred embodiment.

For example, suppose a calling party initiates a call to a call recipient. However, the call recipient is not available to answer this call. Assume that the call recipient does not have a voice mail service. Instead of continuing to call back until the recipient's telephone is answered, the calling party is able to leave the recipient a message by utilizing a remote message delivery service associated with either the caller or the recipient. This message delivery service records the calling party's message and automatically re-dials the call recipient until the call recipient's telephone is answered. By utilizing the preferred embodiment of the present invention, the calling party receives audible confirmation of the call recipient's name prior to leaving a message on the message delivery service. In this way, the caller can avoid leaving a message for a person at a wrong number. Preferably the present invention does not require input from the calling party. In use, the calling party simply places a call to the call recipient, and the present invention provides audible confirmation of the call recipient's identity by providing the calling party with the call recipient's audible name. By utilizing the present invention, the calling party is able to positively identify the call recipient such that the call recipient is correct prior to leaving a message to the call recipient.

Figure 3:
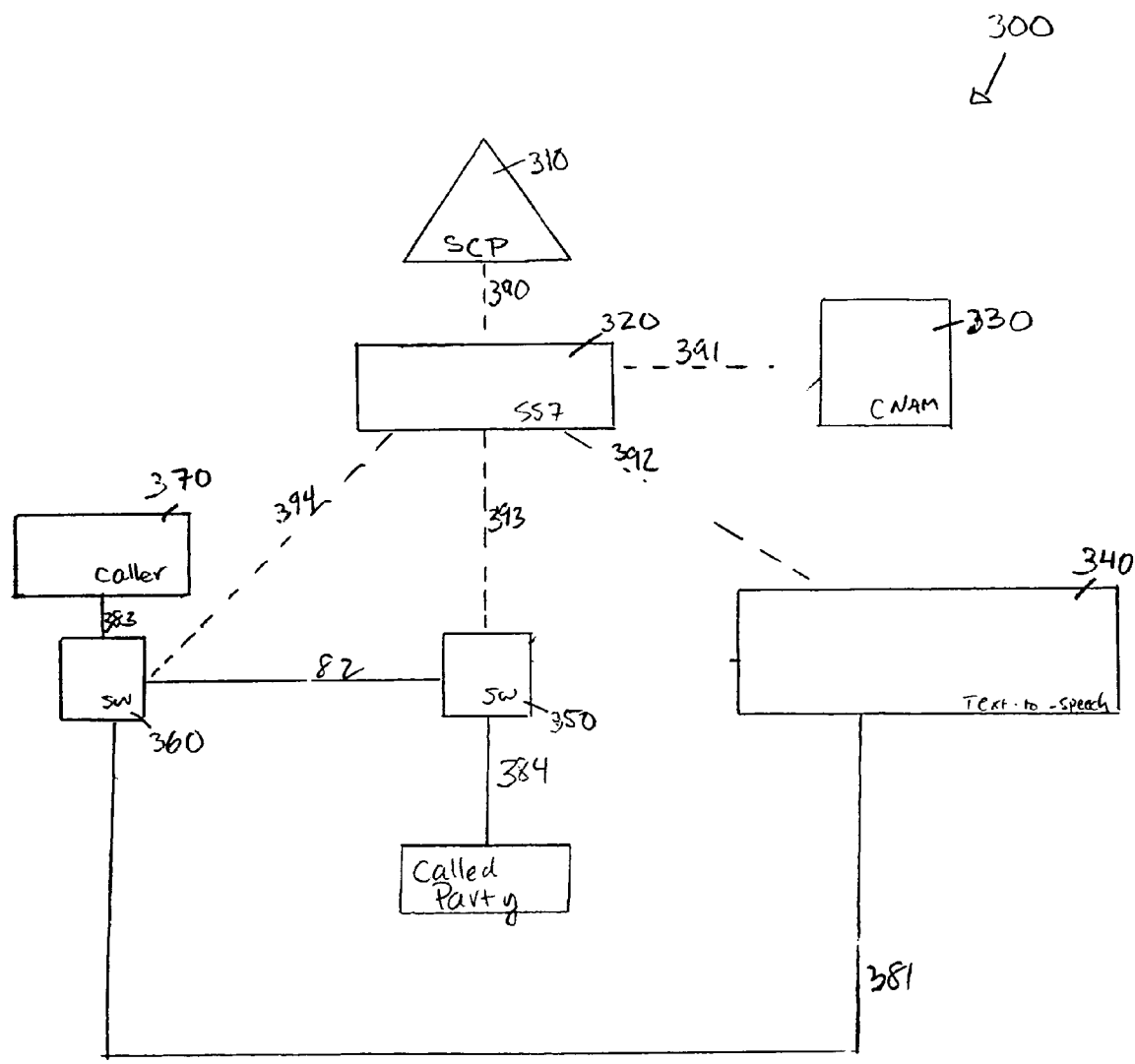
FIG. 3 shows a block diagram of a system for implementing the present invention.

FIG. 3 shows a block diagram of a system for implementing the present invention. The caller 370 dials a telephone number using the speech path 383. The switch 360 notifies the SCP 310 that the caller 370 is attempting to place a call. The notification is made through the control line 394 and 390. The SCP 310 instructs the switch to connect the call temporarily to a Text-To-Speech converter 340. The switch connects the caller to the Text-To-Speech converter 340 through the speech path 381 which in turn is coupled to the switch 360. Concurrently, the dialed number is provided to the Text-To-Speech converter 340 through the control path 394 and 392. The Text-To-Speech converter 340 queries the CNAM database 330 through the control link 392 and 391 to receive the text name associated with the dialed number. Upon receiving the text name, the Text-To-Speech converter 340 converts the text name to an analog signal. The Text-To-Speech converter 340 then plays the analog signal to the caller through the speech path 381 and 383; i.e., it says the name to the caller. After it says the name, the Text-To-Speech converter 340 signals to the SCP-310 that it has completed its task via the control links 392 and 390. The SCP 310 then instructs the switch 360 to continue processing the call and to forward it to its final destination, i.e., the called party connected to the switch 350.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiments chosen for illustration without departing from the spirit and scope of the invention.

Specifically, it will be apparent to one of ordinary skill in the art that the device of the present invention could be implemented in several different ways and is only illustrative of the preferred embodiment of the invention and is in no way a limitation.

What is claimed is:

1. An audible confirmation system in an Intelligent Network for allowing a calling party to audibly hear an audible name of a call recipient, the audible confirmation system comprising:
   a. a database configured for storing a plurality of text names wherein each of the plurality of text names is associated with a unique identifier;
   b. a signal control point coupled to the database, the signal control point independent of and configured to control a call routing path and independent of and configured to control a data path between the calling party, the database, and a text to speech converter, and configured to control the retrieval of a select one of the plurality of text names in response to a call initiated by the calling party directed to the unique identifier, wherein the database is independent of the call routing path; and
   c. the text to speech converter coupled to the control point and configured to convert the selected one of the plurality of text names into the audible name.

2. The audible confirmation system according to claim 1 wherein the unique identifier is a telephone number.

3. The audible confirmation system according to claim 1 wherein the database is a calling name database.

4. A method of allowing a calling party to audibly identify a call recipient, the method comprising the following steps:
   a. initiating a call from the calling party directed to an identifier belonging to the call recipient;
   b. matching the identifier to a text name corresponding to the recipient within a database by a signal control point independent of and configured to control a call routing path and independent of and configured to control a data path between the calling party, the database, and a text to speech converter wherein the database in independent of the call routing path;
   c. retrieving the text name of the recipient from the database;
   d. converting the text name of the call recipient to an audible name; and
   e. audibly playing the audible name of the call recipient to the calling party prior to connecting the call.

5. The method according to claim 4 wherein the identifier is a telephone number belonging to the call recipient.

6. The method according to claim 4 wherein the database is a name calling database.

7. The method according to claim 4 further comprising automatically re-dialing the call recipient if the call cannot be connected.

8. The method according to claim 7 further comprising leaving the call recipient a pre-recorded message from the calling party.

9. A method of allowing a calling party to audibly identify a call recipient, wherein the method comprising the following steps:
   a. pre-recording a voice message by the calling party directed toward an identifier belonging to the call recipient;
   b. matching the identifier to a text name corresponding to the call recipient by a signal control point independent of and configured to control a call routing path and independent of and configured to control a data path between the calling party, a database, and a text to speech converter, wherein the identifier and the text name are stored within the database, further wherein the database is independent of the call routing path;
   c. converting the text name of the call recipient to an audible name;
   d. audibly playing the audible name of the recipient to the calling party; and
   e. audibly delivering the voice message to the call recipient subsequent to audibly playing the audible name to the calling party.

10. The method according to claim 9 wherein the database is a name calling database.

11. The method according to claim 9 wherein the database contains a plurality of identifiers and a corresponding plurality of text names.

12. The method according to claim 9 wherein the identifier is a telephone number belonging to the call recipient.

13. The method according to claim 9 further comprising locating the database which contains the identifier and the text name belonging to the recipient among a plurality of databases.

14. The method according to claim 9 further comprising automatically re-dialing the call recipient if a call for delivering the voice message to the call recipient cannot be connected.

* * * * *

UNITED STATES PATENT AND TRADEMARK OFFICE
CERTIFICATE OF CORRECTION

PATENT NO. : 7,010,111 B1 Page 1 of 1
APPLICATION NO. : 09/513029
DATED : March 7, 2006
INVENTOR(S) : Connie Blackburn, Joel Brand and Douglas William Varney It is certified that error appears in the above-identified patent and that said Letters Patent is hereby corrected as shown below:

Title Page # 56

<u>IN THE REFERENCES CITED - U.S. PATENT DOCUMENTS -p.1</u>

| | | |
|---|---|---|
| Add --5,479,489 | 12/1995 | Stephen A. O'Brien-- |
| Add --6,456,700 | 09/2002 | Dale W. Malik-- |

<u>IN THE CLAIMS - p.8, Column 6, Line 4</u>

In Claim 4, replace "the database in independent" with --the database is independent--.

Signed and Sealed this

Thirteenth Day of February, 2007

JON W. DUDAS
*Director of the United States Patent and Trademark Office*